MILLIVOLT CONTROLLED OSCILLATOR

Filed Feb. 24, 1960 2 Sheets-Sheet 1

SAMUEL NISSIM
PAUL F. SCHEELE
INVENTORS
BY Allen E. Botney, Agent
Morris Spector,
ATTORNEY

MILLIVOLT CONTROLLED OSCILLATOR

Filed Feb. 24, 1960 2 Sheets-Sheet 2

SAMUEL NISSIM
PAUL F. SCHEELE
INVENTORS
BY Allen E. Botney, Agent
Morris Spector
ATTORNEY

United States Patent Office 3,146,408
Patented Aug. 25, 1964

3,146,408
MILLIVOLT CONTROLLED OSCILLATOR

Samuel Nissim, Pacific Palisades, Calif., and Paul F. Scheele, Littleton, Colo., assignors to Thompson Ramo Wooldridge Inc., Canoga Park, Calif., a corporation of Ohio

Filed Feb. 24, 1960, Ser. No. 10,706
9 Claims. (Cl. 332—1)

The present invention relates in general to signal oscillators and more particularly relates to a millivolt controlled oscillator that operates with a high degree of reliability over a wide range of ambient temperatures.

Transducers are customarily employed in a number of different types of equipment, such as telemetry systems, to obtain information about such variable quantities as temperature, pressure, intensity of radiation, etc. Generally speaking, the transducers convert the variations of these quantities to correspondingly varying direct-current analog voltages which may vary from millivolts (±10) to volts (±2.5). To telemeter the information to a ground station for data processing, the direct-current analog voltages obtained from the transducers are respectively converted to corresponding frequency analogs which are then employed to modulate a radio-frequency carrier.

Voltage-controlled oscillators are normally employed to directly convert the high analog voltages (volts) to frequency analogs. However, when a transducer furnishes low analog voltages (millivolts), the present state of the art permits conversion to analog frequencies only by first applying the relatively low-level voltages to a D.C. amplifier to thus obtain high voltage outputs (volts). The high voltages obtained in this manner are then applied to a voltage-controlled oscillator for conversion.

A low-level D.C. amplifier as used for the purposes mentioned basically comprises a chopper (or modulator) stage and its associated driver which converts each low-level direct-current voltage to an alternating-current signal. The alternating-current signals are then amplified and demodulated to produce the needed high-voltage direct-current voltages. These are the output voltages that are applied to the voltage-controlled oscillator for conversion to corresponding frequency analogs.

The millivolt-controlled oscillator of the present invention achieves the same results as the networks found in the prior art but it:

(*a*) Eliminates the demodulation of the amplifier alternating-current voltage; and (*b*) Utilizes the oscillator itself to drive the chopper stage, thereby eliminating the separate driver stage generally used in association with the chopper.

Thus, in one embodiment of the present invention, the alternating-current signal itself rather than the direct-current signal modulates the oscillator.

Furthermore, with respect to the oscilator stages themselves, those used in the prior art are extremely unstable in that considerable frequency drifts occur as ambient temperature changes, especially when transistor elements are used. Consequently, temperature compensation devices are usually included to reduce these drifts. However, in spite of such efforts, it is most unlikely that previous networks can function without undue error at elevated temperatures, such as, for example, 325° F.

The present invention, on the other hand, contemplates connecting the oscillator tank circuit in such a manner between the stages of the oscillator, specifically, between the emitter arms of the transistors used in those stages, that loading of the tank circuit arising out of ambient temperature changes is reduced to a minimum. Stated differently, changes in transistor parameters occurring because of temperature changes are not reflected into the tank circuit. This, plus the fact that a series-resonant circuit is preferred as a tank circuit, leads to very stable oscillator operation.

It is, therefore, an object of the present invention to provide a voltage-controlled oscillator capable of operating stably over relatively wide ambient temperature ranges.

It is another object of the present invention to provide a millivolt-controlled oscillator of relatively simple construction.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
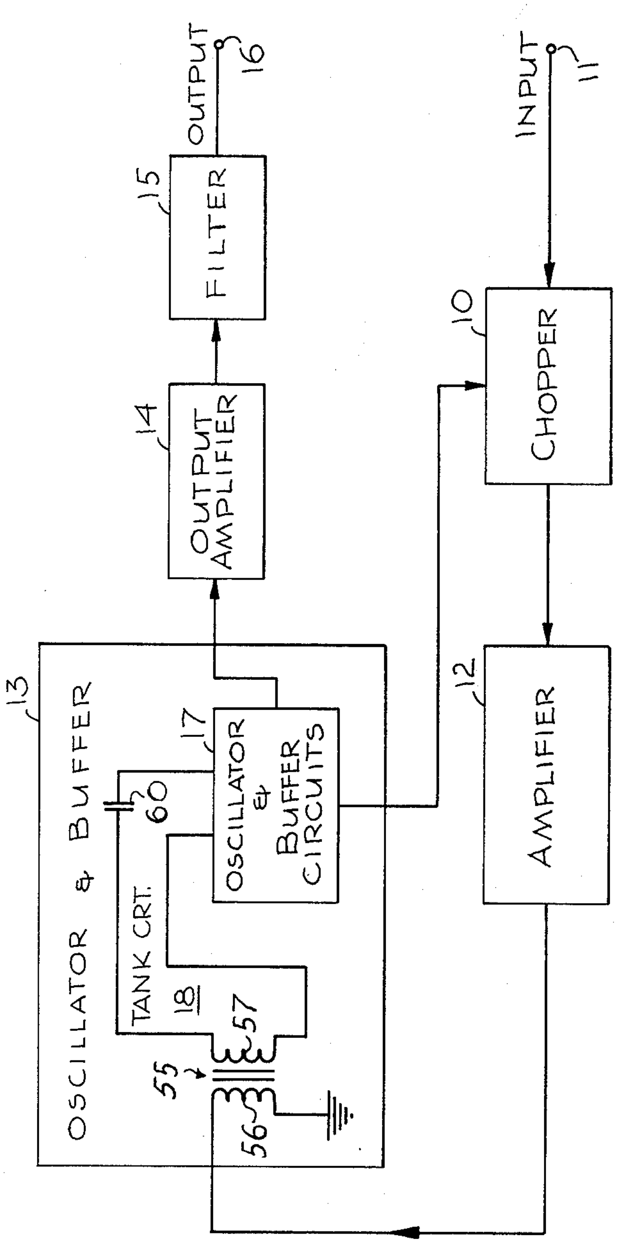
FIGURE 1 is a block diagram of one embodiment of the present invention.

Considering now the drawings, reference is made to FIGURE 1 wherein the embodiment illustrated is shown to include a chopper stage 10 to which direct-current analog voltages on a millivolt level are applied via an input terminal 11. Chopper 10 is coupled through an amplifier 12 to an oscillator and buffer network 13, the network being connected at its output end both to chopper 10 and an output amplifier 14. A filter 15 is connected between amplifier 14 and an output terminal 16 at which frequency analogs are obtained.

Considering oscillator network 13 in somewhat greater detail, it is shown to include various oscillator and buffer circuits 17, a tank circuit, generally designated 18, being coupled between the oscillator circuit stages as will more fully be seen later. Tank circuit 18 is a series-resonant circuit including a capacitor 60 in series with a source of variable inductance generally designated 55, the source used herein being a transformer whose secondary winding 57 is in series with capacitor 60 and whose primary winding 56 is connected between ground and the output end of amplifier 12.

In considering the operation, it should be mentioned first that chopper 10 is analogous to a vibrator type of device in which a direct-current voltage is converted to an alternating-current signal. Accordingly, driven by the oscillations out of network 13, when a low-valued direct-current analog voltage is applied via terminal 11 to chopper 10, the voltage so applied is converted by the switching action of the chopper to an alternating-current signal. Since electronic devices known as choppers are very well known in the art, it is not deemed essential here to describe in detail the manner by which the direct-current signal is converted to an alternating-current signal. Suffice it to say, therefore, that this result is achieved by means of chopper 10.

The alternating-current signal thus derived is amplified in amplifier 12 and thereafter applied to variable inductance source 55 which varies the inductance in the tank circuit according to the voltage variations applied to it. Specifically, when a ferrite material is subjected to the influence of both A.C. and D.C. fields, the inductance of a coil wound on the ferrite material depends upon the magnitudes of both the A.C. and the D.C. fields. If a ferrite-cored inductor be used in the frequency determining circuit of an oscillator, the inductance and hence the oscillator frequency can be varied by changing the magnitude of the field acting on the ferrite core material. Variable inductance or variable reactance modulation results when this principle is applied to produce frequency modulation of an oscillator. Consequently, the resonant frequency of tank circuit 18 is altered in accordance with the principles just mentioned, the result being that the signal produced by oscillator network 13 as applied to amplifier 14 is frequency modulated, that is to say, the oscillator signal is a frequency analog of the signal applied to the network. After being amplified by amplifier 14, the frequency analog is passed through filter 15 which eliminates any distortion in the output waveform developed at output terminal 16.

Figure 2:
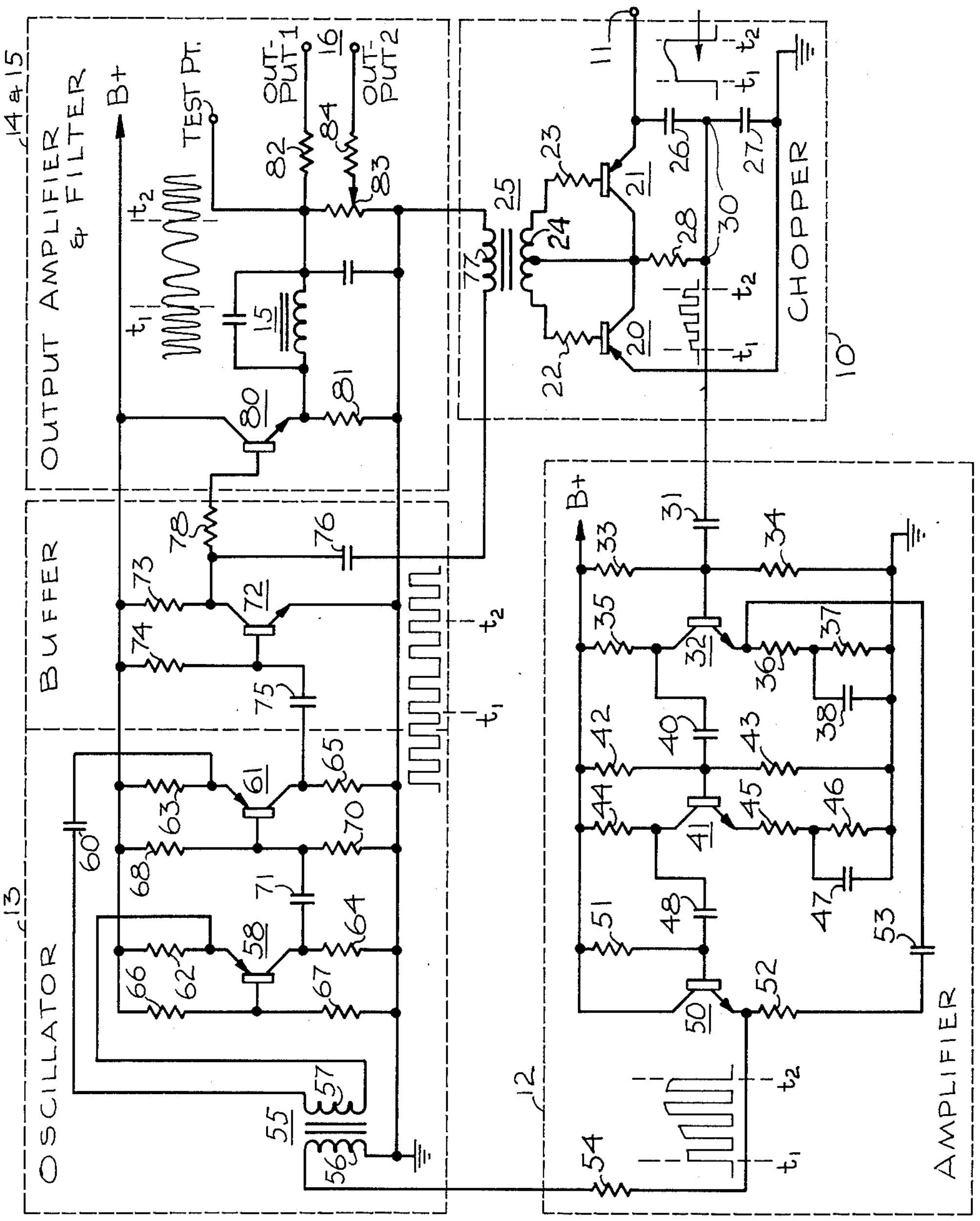
FIGURE 2 is a circuit diagram of the FIGURE 1 embodiment.

Having thus described the broad aspects of the embodiment shown in block form in FIGURE 1, reference is now made to FIGURE 2 wherein the embodiment is shown in greater detail. Thus, as shown, chopper stage 10 includes a pair of PNP transistors, generally designated 20 and 21, the base elements of these transistors being respectively coupled through resistors 22 and 23 to opposite ends of a transformer winding 24, the transformer itself being generally designated 25. The emitter element of transistor 20 is connected directly to ground whereas the emitter element of transistor 21 is coupled to ground through a pair of capacitors 26 and 27 connected in series, the subject emitter element also being connected to input terminal 11. The collector elements of transistors 20 and 21 are connected together to a center tap of the transformer winding 24 and also to one end of a resistor 28 which has its other end connected to the junction of capacitors 26 and 27. This junction point is designated 30 and constitutes the output terminal for the chopper stage. Accordingly, junction point 30 is coupled to amplifier 12.

Specifically, the junction point is coupled through a capacitor 31 in the amplifier to the base element of a NPN transistor 32, a bias voltage being supplied to the base element by means of a voltage divider comprising two resistors 33 and 34 connected in series between a source of positive potential B+ and ground, the base element of transistor 32 being connected to the junction between these two resistors. The collector element of transistor 32 is coupled to B+ through a resistor 35 while the emitter element thereof is coupled to ground through a pair of series-connected resistors 36 and 37, a by-pass capacitor 38 being connected between ground and the junction of resistors 36 and 37. Thus, as shown in the figure, capacitor 38 is connected in parallel with resistor 37.

This first stage of amplifier 12 just described is coupled to a second stage therein by means of a coupling capacitor 40 connected between the collector element of transistor 32 in the first stage and the base element of a NPN transistor 41 in the second amplifier stage. As before, the base element of transistor 41 is biased by means of a voltage divider connected between B+ and ground, the voltage divider including a pair of series-connected resistors 42 and 43. Here again, the collector element is coupled through a resistor 44 to B+ and the emitter element is coupled through a pair of series-connected resistors 45 and 46 to ground, resistor 46 being shunted by a by-pass capacitor 47. It will be obvious from an examination of amplifier 12 that the two stages described are substantially identical in nature and, furthermore, that the output of the second stage, taken from the collector element of transistor 41, is coupled to a cathode-follower type of output stage, the coupling being accomplished by means of a coupling capacitor 48 connected between said collector element and the base element of a third NPN transistor 50. In this output stage, both the collector and base elements are connected to voltage source B+. However, the collector element is connected directly to B+ whereas the base element is coupled to it through a resistor 51. The emitter element of transistor 50, on the other hand, is coupled back to the emitter element of transistor 32 in the first amplifier stage, the stated coupling being provided by means of a resistor 52 and capacitor 53 connected in series between these two emitter elements in the arrangement shown in the figure. The emitter element of transistor 50 is, in addition, coupled through a resistor 54 to the output end of amplifier 12 which connects to the input end of oscillator 13 via an iron-core transformer generally designated 55.

Specifically, transformer 55 includes primary and secondary windings 56 and 57, respectively, the primary winding being connected between ground and the output of amplifier 12. As for the secondary winding, it is connected at one end to the emitter of a first PNP transistor 58 and at the other end is coupled through a capacitor 60 to the emitter of a second PNP transistor 61. Winding 57 and capacitor 60 constitute the elements of a series-resonant tank circuit so that in the oscillator of the present invention the tank circuit is a series-resonant rather than a parallel-resonant circuit and is coupled between the emitter elements of the transistors in the oscillator stages. The advantages of doing so have already been mentioned.

The emitter elements of transistors 58 and 61 are respectively coupled through a pair of resistors 62 and 63 to voltage source B+, the collector elements of these transistors also being respectively coupled to ground through a pair of resistors 64 and 65. As for the base elements of transistors 58 and 61, they are each connected to a voltage divider comprising a pair of resistors connected in series between voltage source B+ and ground, the two resistors of the voltage divider connecting to transistor 58 being designated 66 and 67 and the two resistors of the voltage divider connecting to transistor 61, being designated 68 and 70. The base element of transistor 58 is connected to the junction of resistors 66 and 67 while the base element of transistor 61 is connected to the junction of resistors 68 and 70. It will also be noted from the arrangement in FIGURE 2 that the base element of transistor 61 is coupled by means of a capacitor 71 to the collector element of transistor 58.

Following the oscillator stages is the buffer amplifier stage and this stage includes a NPN transistor 72 whose emitter element is connected directly to ground, whose collector element connects through a resistor 73 to voltage source B+, and whose base element is respectively coupled through a resistor 74 and a capacitor 75 to voltage source B+ and the collector element of transistor 61. The output of the buffer amplifier is taken from the collector of traansistor 72 and this element is coupled through a capacitor 76 to one end of the primary winding of transformer 25. The primary winding is designated 77 and it is connected at its other end to ground.

Referring once again to the collector element of transistor 72, this element is also coupled through a resistor 78 to the next stage which is the output amplifier and, in particular, is coupled to the base element of a NPN transistor 80 therein. The collector element of transistor 80 is connected directly to voltage source B+ whereas the emitter element of this transistor is connected through a resistor 81 to ground. Resistor 81 is the load resistor for the stage so that the emitter element of transistor 80 constitutes its output terminal. Accordingly, the emitter element is also connected to filter 15, the output of the filter coupling through a fixed resistor 82 to a first output terminal or through variable and fixed resistors 83 and 84, respectively, to a second output terminal. In keeping with the designation given to the output terminal in FIG. 1, the first and second output terminals in FIG. 2 are generally designated 16.

Considering the mode of operation once again, the low-level voltage input is fed to chopper circuit 10 which functions like a switch in that transistors 20 and 21 are alternately switched to the saturation regions. Consequently, the analog voltage applied to input terminal 11 is repetitively sampled to thereby convert the direct-current signal to an alternating-current signal. This alternating-current signal appears across resistor 28 and is fed from junction point 30 through capacitor 31 to amplifier 12. Since amplifier 12 is a conventional feedback A.C. amplifier whose operation is well known, suffice it to say that the alternating-current signal applied to it is amplified, as shown in the figure.

The output from amplifier 12, developed between the emitter of transistor 50 and ground, is taken off the emitter and applied to transformer 55 in oscillator network 13. In other words, the signal out of the amplifier is fed to the oscillator tank circuit wherein, because of the varying amplitude of the signal out of amplifier 12 and in accordance with the principles previously delineated, the inductive reactance of the tank circuit is correspondingly varied. As a result, the frequency of the signal generated by oscillator 13 varies as the amplitude of the signal applied to it, as shown by the waveform alongside the oscillator circuit. The oscillator output is then passed through the buffer or isolation amplifier and taken off the collector of transistor 72.

The signal of varying frequency thusly developed by the oscillator is applied through capacitor 76 to transformer 25 in chopper stage 10 and, by so doing, the chopper is driven by the oscillator itself. The oscillator output is also applied via resistor 78 to amplifier 14 wherein, as implied, it is amplified. Thereafter, the signal which is basically a square-wave, is passed through filter 15 which then transforms the signal to a sinusoidal type, as shown in the figure. The frequency of this sinusoidal output varies as the frequency of the square-wave oscillator output and since the frequency of the latter in turn varies with the amplitude of the direct-current voltage applied to input terminal 11, it is thus seen that the signal developed at output terminals 16 is the frequency analog of the direct-current input signal.

Although a particular arrangement of the invention has been illustrated by way of example, it is not intended that the invention be limited thereto. Accordingly, the invention should be considered to include any and all modifications, alterations or equivalent arrangements falling within the scope of the annexed claims.

Having thus described the invention, what is claimed is:

1. A voltage-controlled oscillator network for producing frequency analogs of direct-current analog voltages applied to the network, said network comprising: a free-running voltage-controlled multivibrator for generating a square wave; means receptive of the direct-current analog voltage and driven by said square wave for repetitively sampling the analog voltage to produce a sequence of pulses of varying amplitude, said pulse sequence being applied to said multivibrator to vary the pulse repetition rate of said square wave in accordance with the amplitude variations of said pulse sequence; and means for filtering said varying square wave to produce a frequency-modulated signal that is substantially sinusoidal in nature, whereby a frequency analog of the applied direct-current voltage is produced.

2. A voltage-controlled oscillator network for producing frequency analogs of direct-current analog voltages applied to the network, said network comprising: means for repetitive sampling each applied analog voltage; a voltage-controlled oscillator for producing a square wave, said oscillator being coupled to said means and operable in response to the voltage samples to vary the pulse repetition rate of said wave in accordance with the amplitude variations of said voltage samples; and a filter coupled to said oscillator for receiving said square wave and producing a frequency-modulated signal therefrom, the frequency variations of said signal corresponding to the amplitude variations of said direct-current analog voltage.

3. The network defined in claim 2 wherein said voltage-controlled oscillator includes a pair of transistors, a series-resonant tank circuit coupled between the emitter elements of said transistors and a transformer whose secondary winding is a variable inductance of said tank circuit and whose primary winding is coupled to said means.

4. The network defined in claim 2 wherein said voltage-controlled oscillator includes first and second transistors; first and second resistors respectively connected between the emitter elements of said first and second transistors and a first source of potential; third and fourth resistors respectively connected between the collector elements of said first and second transistors and a second source of potential; first and second voltage dividers connected between said first and second sources of potential and respectively connected to the base elements of said first and second transistors for applying bias thereto; a capacitor coupled between the collector element of said first transistor and the base element of said second transistor; a saturable-core transformer responsive to signals from the voltage sampling means; and a series-resonant tank circuit comprising a capacitor and a variable inductor connected between the emitter elements of said first and second transistors, the variable inductor being the secondary winding of said transformer.

5. In a network for producing frequency analogs of direct-current analog voltages applied to the network, a voltage-controlled oscillator comprising: first and second transistors; first and second resistors respectively connected between the emitter elements of said first and second transistors and a first source of potential; third and fourth resistors respectively connected between the collector elements of said first and second transistors and a second source of potential; first and second voltage dividers connected between said first and second sources of potential and respectively connected to the base elements of said first and second transistors for applying bias thereto; a capacitor coupled between the collector element of the first transistor and the base element of said second transistor; a ferrite-core transformer coupled to an analog voltage; and a series-resonant tank circuit comprising a capacitor and a variable inductor connected between the emitter elements of said first and second transistors, the variable inductor being the secondary winding of said transformer.

6. A millivolt-controlled oscillator network for producing frequency analogs of direct-current analog voltages applied to the network, said network comprising: a voltage-controlled oscillator for generating a square wave, said oscillator including first and second transistor stages, a series-resonant tank circuit including a variable inductance element coupled between the emitter elements of the transistors in said first and second stages, and an iron-core transformer whose secondary winding is the variable inductance element of said tank circuit; a chopper stage coupled to said voltage-controlled oscillator and driven by the square wave therefrom to repetitively sample the direct-current analog voltage; an alternating-current amplifier coupled between said chopper stage and the primary winding of said transformer, said amplifier applying the amplified voltage samples to said voltage-controlled oscillator, the pulse repetition rate of said square wave being varied in accordance with the amplitude variations of said voltage samples; and an output circuit coupled to said voltage-controlled oscillator for filtering said square wave to produce a substantially sinusoidal output signal whose frequency varies as the pulse repetition rate of said square wave, thereby to a produce a frequency analog of the applied direct-current voltage.

7. An oscillator network for producing a frequency analog of analog voltages applied thereto comprising:
- an oscillator for producing output signals at a frequency determined by the resonant frequency of its tank circuit,
- means producing a sequence of pulses of varying amplitude in accordance with the amplitude of said analog voltages, and
- means for applying said sequence of pulses to said oscillator to vary the resonant frequency of its tank circuit in accordance with the amplitude variations of said sequence of pulses, whereby a frequency analog of voltages applied thereto is produced.

8. An oscillator network for producing a frequency analog of analog voltages applied thereto comprising:

an oscillator having a tank circuit, means receptive of said analog voltages and driven by said oscillator for repetitively sampling said analog voltages to produce a sequence of pulses of varying amplitude, means for applying said sequence of pulses to said oscillator to vary the resonant frequency of said tank circuit in accordance with amplitude variations of said pulses, whereby a frequency analog of said analog voltages is produced by said oscillator.

9. An oscillator network for producing a frequency analog of voltages applied thereto comprising:

an oscillator with a tank circuit coupled between oscillator circuit stages therein, means sampling said voltages to produce a sequence of pulses of amplitude varying in accordance with variations in amplitude of said voltages, and means varying the resonant frequency of said tank circuit in accordance with amplitude variations of said pulses, whereby a frequency analog of said voltages is produced by said oscillator.

References Cited in the file of this patent

UNITED STATES PATENTS

| | | |
|---|---|---|
| 2,510,054 | Alexander et al. | June 6, 1950 |
| 2,549,505 | Mohr | Apr. 17, 1951 |
| 2,857,573 | Lin | Oct. 21, 1958 |
| 2,924,788 | Maurushat | Feb. 9, 1960 |

OTHER REFERENCES

"Junction Transistor Electronics," by Hurley, published by John Wiley & Sons, Inc., pages 318–319.